Patented Feb. 10, 1948

2,435,883

UNITED STATES PATENT OFFICE 2,435,883

WROUGHT GRAY IRON WELDING ROD

Raymond J. Franklin, Chicago, Ill., assignor to The Chicago Hardware Foundry Company, North Chicago, Ill., a corporation of Illinois No Drawing. Application November 13, 1944, Serial No. 563,317

4 Claims. (Cl. 219—8)

This invention relates to a wrought gray iron welding rod and to a method of making the same.

It has heretofore been customary to cast welding rods to size in sand or permanent molds to produce either gray cast iron or white cast iron welding rods. Since welding rods are generally of fairly small diameter, of the order of one-eighth to three-eighths of an inch, the volume of welding rods that can be produced is considerably limited by the time and labor required for casting such small diameter rods and handling the same.

In accordance with the present invention, a much greater volume of welding rods can be produced with no increase in casting equipment. Instead of casting to the final dimensions of the welding rods, ingots of considerably larger diameter are cast and the ingots are then forged to the desired final diameter with consequent great increase in length. The as-cast ingots may be either white cast iron, or a casting that has either a mottled or a gray iron core and an outer skin of white iron. In general, the ingot should have a skin chill equal to about 50% of the cross sectional area of the casting in order to insure satisfactory results in the forging step, since an ingot formed wholly of gray iron or of mottled iron cannot be satisfactorily swaged or rolled.

The forging of the cast ingot is preferably carried out in two stages. In the first stage the ingot is reduced in a rolling operation and for this operation standard rolling equipment is used. It has generally been found satisfactory to carry out this initial rolling operation with the ingot heated to a temperature between 1550° and 1750° F. Only a slight amount of reduction is effected in each pass; and a sufficient number of passes are used to reduce the diameter of the original ingot down to one-quarter inch to three-sixteenths inch diameter. In the second stage a swaging operation is preferably used, for which the type of swaging equipment is similar to that used in the swaging of tungsten or other types of wire. It has generally been found satisfactory to carry out this swaging operation with the previously rolled rod at a temperature of between 1550° and 1750° F. Only a slight amount of reduction is effected in each pass; that is to say, in the neighborhood of up to 0.040" in diameter, and a sufficient number of passes are used to reduce the diameter to the final diameter that is required. As a final step, the rod may be drawn to accurate dimensions.

After the final forging operation, during which graphitization takes place, the product is pickled, straightened if necessary, and cut into the desired lengths. The product, which is herein termed a wrought gray iron welding rod, has a greatly increased tensile strength and is relatively malleable in that it can be bent and then straightened. From the standpoint of its use as a welding rod, it has improved characteristics in that the metal of the rod when melted for welding purposes is more fluid and produces a cleaner weld. The reason is that the skin or film customarily produced during any casting process is removed during the forging operation. The forging operation produces a more homogeneous metal, with less imperfections in the body of the rod, and this results in a more efficient operation in any welding process.

It is therefore an important object of this invention to provide a wrought gray iron welding rod of improved welding characteristics.

It is further understood that these wrought iron rods can be used for the full range of welding purposes. They may be used as they are produced, for oxy-acetylene welding, in which instance a flux would be used independently of the rod or, a flux may be applied on the rod to assist in this process. The rods may also be used in the electric arc welding process, in which instance they could be used as they are produced or, they could be coated by either an extruding or tipping process, to produce a flux-coated electrode. The metal could also be cast in the form of cored ingots, flux introduced into the core cavity and the ingot then reduced to size, in which instance the rods would be suitable for both the electric arc and the oxy-acetylene processes.

It is a further important object of this invention to provide a wrought gray iron welding rod and a method of producing the same, starting with an ingot of white iron, or one having a skin chill of substantial proportions with respect to the cross-sectional area of the ingot, heating the ingot and forging the heated ingot, as by rolling and/or swaging, down to the desired diameter of the final welding rod.

Other and further important objects of this invention will be apparent from the disclosures in the specification and the appended claims.

In general, the composition that has been found suitable for producing a wrought gray iron welding rod of my invention is any composition which, in normal practice, would result in a gray cast iron as distinguished from a malleable cast iron. For the purposes for which my welding rod is intended, the following specification of composition limits is typical:

| | Per cent |
|---|---|
| Total carbon | 3 to 3.5 |
| Silicon | 2 to 3.5 |
| Manganese (maximum) | 0.75 |
| Phosphorus (maximum) | 0.75 |
| Sulphur (maximum) | 0.12 |

In the casting of a gray iron composition such as the above, permanent molds of sufficient mass to produce a surface or skin chill equal to at least about 50% of the cross-sectional area of the ingot should be employed. The ingot may, however, be cast as white iron throughout, or it may be cast with a mottled or gray core but in the latter case, as indicated, there should be a skin chill equal to about 50% of the cross-sectional area of the ingot. Otherwise, the subsequent forging operation cannot be carried out so satisfactorily.

As to the size of the ingot, the dimensions are, in general, limited only by the size of the rolling and swaging machine that is available. Ingots up to about twenty-four inches in length and one-half inch in diameter have been reduced to the desired diameter with results that are entirely satisfactory. While cylindrical ingots are preferable, ingots of polygonal or square cross section may be employed.

The ingot is next heated to a temperature of between 1550° and 1750° F., preferably to a temperature of about 1675° F., and subjected while at that temperature to a rolling or swaging operation, or successively to a rolling and swaging operation. For this purpose, conventional types of rolling and swaging machines may be used. In the case of the rolling machine, modifications in the design of the roll passes may be necessary so as to reduce to a minimum the extent of the hot working of the metal. In the case of the swaging machine the conventional type may be used without modification and is of a type in which two or more dies having segmental, cylindrical working surfaces are revolved about the work while being caused to deliver rapid impact blows to the work. With the work being drawn between the revolving dies at a rate of about three-quarters inch per second, the amount of reduction for each pass can suitably be in then neighborhood of up to 0.040" in diameter. Between successive passes, the work is re-heated to the desired temperature, or means may be provided, such as an induction coil heater, for maintaining the temperature of the work at the swaging temperature. Preferably, the temperature of the ingot during swaging should not be carried above about 1750° F. since higher temperatures affect the operation adversely.

In general, the work cannot be permitted to "soak" at the forging temperature, since under those conditions it would go over rapidly to gray iron before being reduced, and the result then would not be so satisfactory. A certain amount of annealing takes place simultaneously with the reducing operation. The combined carbide in the white iron of the ingot is largely converted into graphitic carbon as a result of the temperature employed and the forging operation.

After swaging or rolling to approximately the desired final diameter, the work may be drawn to the dimensions specified, then pickled, straightened if necessary, and finally cut to the length of the final welding rod. The result is a wrought gray iron welding rod having improved welding characteristics in that it will melt to give a more fluid and cleaner weld metal than is the case with welding rods cast in sand molds.

Instead of reducing the diameter of the ingot by a combined rolling and swaging operation, reduction can be effected in its entirety by either the rolling operation or the swaging operation, or by other hot forging operations.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A wrought gray iron welding rod.
2. A hot forged welding rod of gray cast iron composition.
3. A wrought welding rod having a composition lying within the following percentages by weight:

| | Per cent |
|---|---|
| Total carbon | 3 to 3.5 |
| Silicon | 2 to 3.5 |
| Manganese (maximum) | 0.75 |
| Phosphorus (maximum) | 0.75 |
| Sulphur (maximum) | 0.12 |
| Iron | Balance |

4. A wrought welding rod of gray cast iron composition having improved welding properties as compared with sand molded gray cast iron welding rods.

RAYMOND J. FRANKLIN.

REFERENCES CITED

The following references are of record in the file of this patent:

UNITED STATES PATENTS

| Number | Name | Date |
|---|---|---|
| 395,684 | Baker | Jan. 8, 1889 |
| 406,946 | Norton et al. | July 16, 1889 |
| 1,540,558 | Merrill | June 2, 1925 |
| 2,158,105 | Burgess | May 16, 1939 |
| 2,241,270 | Nipper | May 6, 1941 |